(12) United States Patent
Iwakuni

(10) Patent No.: US 7,376,406 B2
(45) Date of Patent: May 20, 2008

(54) DIVERSITY RECEPTION APPARATUS

(75) Inventor: Kaoru Iwakuni, Nabari (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 465 days.

(21) Appl. No.: 11/103,591

(22) Filed: Apr. 12, 2005

(65) Prior Publication Data

US 2005/0233717 A1    Oct. 20, 2005

(30) Foreign Application Priority Data

Apr. 16, 2004    (JP) .............................. 2004-121557

(51) Int. Cl.
*H04B 7/08* (2006.01)
*H04B 1/06* (2006.01)

(52) U.S. Cl. .................. 455/269; 455/132; 455/272

(58) Field of Classification Search ............... 455/101, 455/562.1, 132–140, 575.7, 272–279.1; 375/347
See application file for complete search history.

(56) References Cited

U.S. PATENT DOCUMENTS

| | | | | |
|---|---|---|---|---|
| 5,303,396 A | * | 4/1994 | Ooyagi et al. | ............... 455/134 |
| 5,335,251 A | * | 8/1994 | Onishi et al. | ............... 375/347 |
| 5,548,836 A | * | 8/1996 | Taromaru | ............... 455/277.1 |
| 5,805,643 A | * | 9/1998 | Seki et al. | ............... 375/347 |
| 6,032,033 A | * | 2/2000 | Morris et al. | ............ 455/277.2 |
| 6,571,090 B1 | * | 5/2003 | Moriyama et al. | ........ 455/277.1 |
| 2001/0016478 A1 | | 8/2001 | Lindenmeier et al. | |

FOREIGN PATENT DOCUMENTS

| | | |
|---|---|---|
| JP | 5-175942 | 7/1993 |
| JP | 3033308 | 2/2000 |
| JP | 2001-267988 | 9/2001 |

* cited by examiner

*Primary Examiner*—Simon Nguyen
(74) *Attorney, Agent, or Firm*—Wenderoth, Lind & Ponack, L.L.P.

(57) ABSTRACT

A diversity reception apparatus having a simple configuration which includes only one AD conversion unit and receives analog modulated signals is provided. The diversity reception apparatus includes a switching unit that analog-multiplexes signals received by two antennas using time-division method and is placed in front of an AD conversion unit. The apparatus also includes a time-division separation unit that (i) obtains time-division multiplexed signals digitized by driving at the same frequency as driving frequency of the AD conversion unit and (ii) separates the time-divided signals into a signal per antenna. Moreover, the apparatus includes signal quality judgment units that judge each signal quality of the time-divided signals and a composition unit that executes composition processing based on the signal quality.

8 Claims, 6 Drawing Sheets

DIVERSITY RECEPTION APPARATUS

BACKGROUND OF THE INVENTION (1) Field of the Invention

The present invention relates to a diversity reception apparatus which uses two or more antennas to improve the reception quality. In particular, the present invention relates to a diversity reception apparatus which receives analog modulated signals.

(2) Description of the Related Art

Conventionally a diversity reception apparatus has been widely used regardless of broadcast and communication, the diversity reception apparatus using two or more antennas and attempting to improve the reception quality. And, the usefulness of such diversity reception apparatus is widely known.

On the other hand, there is a universal problem with the diversity reception apparatus. The diversity reception apparatus must have a plurality of reception processing systems associated with the plurality of antennas. In particular, a diversity reception apparatus called phase composing diversity has a complex configuration, adjusting each phase of signals received respectively by a plurality of antennas and additively synthesizing the signals. Thus, there is a problem that the implementation cost is substantial.

Also, in the case where later described demodulation processing is realized using digital method, there is a significant problem that a plurality of analog/digital conversion units (hereinafter, referred to as AD conversion unit) are required, but the AD conversion unit is expensive for a single component, and occupies a large space when incorporated in a Large Scale Integration (LSI) chip.

Conventionally, there have been suggested various solutions for the above mentioned problems. For example, Japanese Laid-Open Patent application No. 05-175942 discloses realizing synthetic diversity processing using a simple configuration which includes (i) a means for executing switching processing with an interval that is half a symbol period and (ii) only one AD conversion unit that has been conventionally required as many as two or more in a diversity reception apparatus which receives digital demodulated signal waves having relatively long symbol lengths.

In addition, Japanese Laid-Open Patent application No. 2001-267988 discloses a well-known technique executed by a diversity reception apparatus which receives analog modulated signals, the diversity reception apparatus having a configuration in which (i) a phase adjustment processing is executed, using a phase shifter, by executing analog processing on one or all of signals received by a plurality of antennas, (ii) the one or all of signals are additively composed and (iii) the composed signals are outputted to a demodulation processing unit executing analog or digital processing.

However, in such conventional diversity reception apparatus as described above, according to the technique disclosed in the Japanese Laid-Open Patent application No. 05-175942, the signal in the symbol period which is a relatively long time is fixed to a constant pattern, using a characteristic of a digital modulation method. Thereby, there is a problem that the above mentioned technique can only be applied to a diversity reception apparatus which receives digital modulated signals, and cannot be applied to a diversity reception apparatus which receives analog modulated signal.

On the other hand, in the case where phase composition is executed by analog processing such as the technique disclosed in the Japanese Laid-Open Patent application No. 2001-267988, there is a problem in implementation cost that control by analog signal is required, therefore a component of high precision is required, and adjustment after implementation is required.

An object of the present invention, in view of the above mentioned problems, is to provide a diversity reception apparatus executing phase composition using a digital method, which (i) can be realized by a simple configuration that only requires one AD conversion unit and (ii) can be applied to receiving analog modulated signals.

SUMMARY OF THE INVENTION

In order to solve the above mentioned problems, a diversity reception apparatus according to the present invention composes signals received by N antenna terminals, where the N is a positive integer which is two or larger. The apparatus includes a switching unit operable to sequentially switch the N inputs for the signals received by the N antenna terminals and also to output a single signal, and an analog/digital (AD) conversion unit operable to convert the signal outputted from the switching unit into a time-division multiplexed digital signal. The diversity reception apparatus also includes a time-division separation unit operable to separate, into N signals, the digital signal converted by the AD conversion unit and also to output the N signals, and a timing generation unit operable to control each operation of the switching unit, the AD conversion unit and the time-division separation unit, using a timing signal having the same frequency.

Also, the diversity reception apparatus according to the present invention includes only each one of the switching unit, the AD conversion unit and the time-division separation unit.

According to such configuration as described above, the diversity reception apparatus according to the present invention uses the switching unit, uses the one AD conversion unit for processing the signals received by the plurality of antennas, and can compose the received signals dealing with both of digital demodulated signals and analog demodulated signals by using the multiplex method which does not depend on a specific symbol data structure.

In order to achieve the above mentioned object, the present invention can be realized as a diversity reception method which includes, as steps, the characteristic components of the diversity reception apparatus or a car including the diversity reception apparatus The disclosure of Japanese Patent Application No. 2004-121557 filed on Apr. 16, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Figure 1:
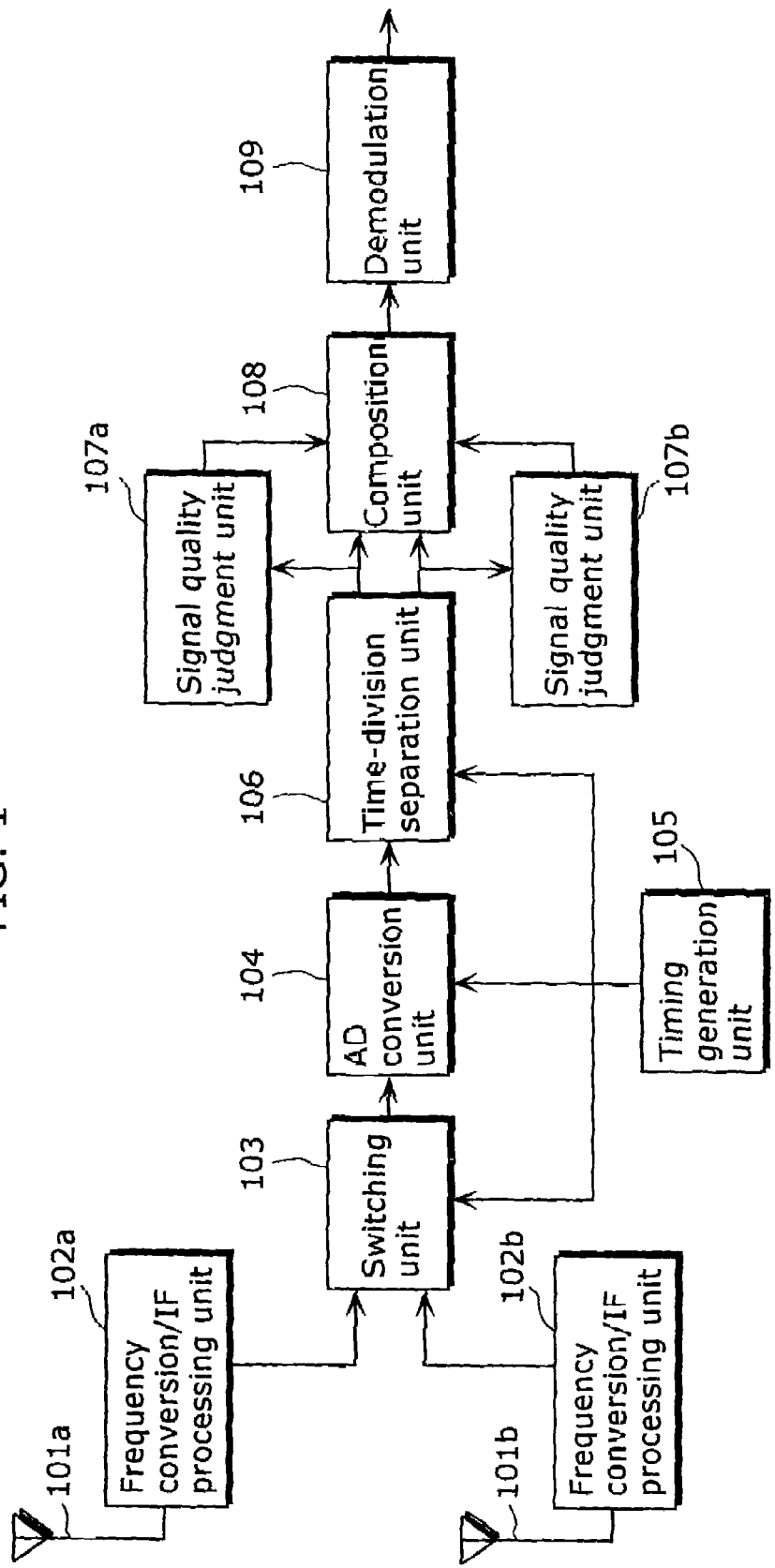
FIG. 1 is a block diagram showing a configuration of a diversity reception apparatus according to a first embodiment of the present invention.

Hereinafter, embodiments of the diversity reception apparatus according to the present invention will be explained referring to the drawings.

First Embodiment

FIG. 1 is a block diagram showing a configuration of a diversity reception apparatus according to a first embodiment of the present invention. Although the following explanation uses an example of the case where two antennas (that is, N=2: N is a positive integer) are connected for the sake of simplification, there are other cases as well.

Also, the diversity reception apparatus according to the first embodiment executes composition processing on intermediate frequency (IF) signals obtained by the two antennas using only one AD conversion unit.

In FIG. 1, the diversity reception apparatus includes: antenna terminals 101a and 101b; frequency conversion/IF processing units 102a and 102b, respectively, connected to the antenna terminals 101a and 101b; a switching unit 103; an AD conversion unit 104; a time-division separation unit 106; a timing generation unit 105 connected to each of the AD conversion unit 104 and the time-division separation unit 106; signal quality judgment units 107a and 107b connected to the time-division separation unit 106; a composition unit 108; and a demodulation unit 109.

A signal received by the antenna terminal 101a is converted to a predetermined intermediate frequency by the frequency conversion/IF processing unit 102a, filtered with a predetermined passing bandwidth, and then inputted into the first input of the switching unit 103. Similarly, a signal received by the antenna terminal 101b is converted to a predetermined intermediate frequency by the frequency conversion/IF processing unit 102b, filtered with a predetermined passing bandwidth, and then inputted into the second input of the switching unit 103.

The switching unit 103 sequentially switches the signals inputted from the two inputs, and outputs the signals, according to a timing signal generated by the timing generation unit 105. It is preferable that the switching frequency is generally N times as high as sampling frequency which is required in the processing of the demodulation unit 109. In the first embodiment, since there are two antennas, it is preferable to set the switching frequency twice as high as the sampling frequency. The switching unit 103 outputs a signal which is a multiplexed form, using the time-division method, of the signal associated with the antenna terminal 101a and the signal associated with the antenna terminal 101b at the analog signal level.

The AD conversion unit 104 (i) synchronizes the analog signal with the timing signal provided by the timing generation unit 105, the analog signal being outputted by the switching unit 103 which sequentially switches the signals to be outputted and (ii) converts the analog signal into a digital signal.

Figure 2A:
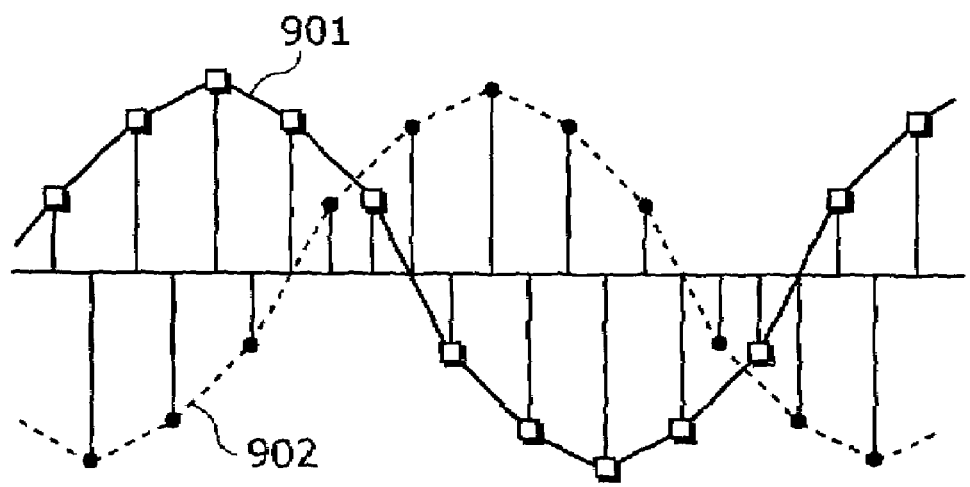
FIG. 2 is a schematic diagram showing an overview of input and output signals in an AD conversion unit.
Figure 2B:
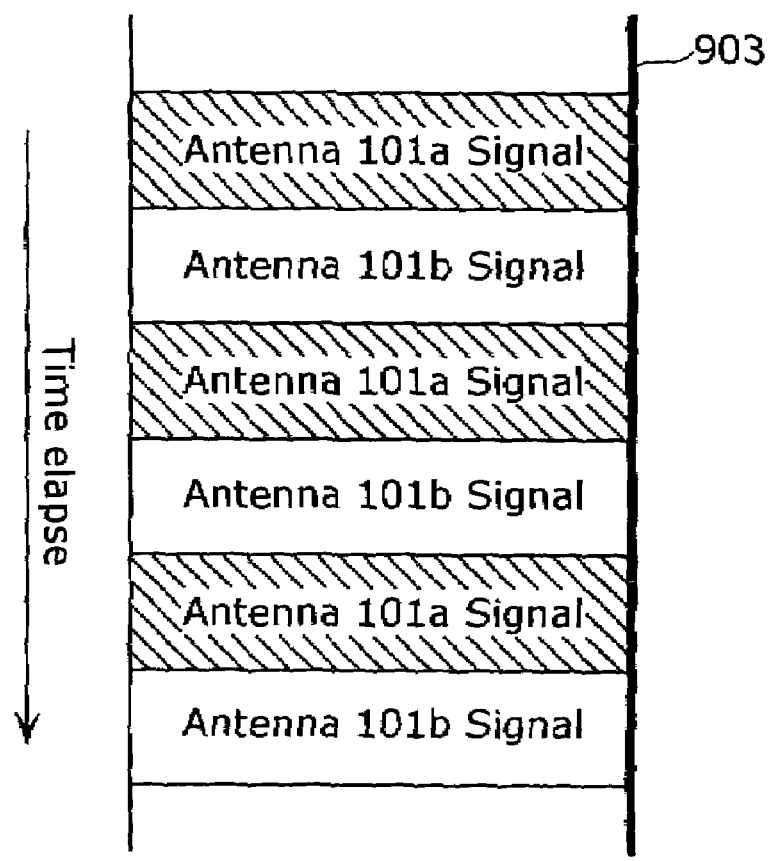

FIGS. 2A and 2B are schematic diagrams showing an overview of input and output signals in the AD conversion unit 104. In FIG. 2A, the analog signal 901 and the analog signal 902 schematically show examples of analog signals inputted into the first and the second inputs of the switching unit 103. An analog value is outputted as the output of the switching unit 103, the analog value being a value calculated by alternately sampling the analog signal 901 and the analog signal 902. And, the analog value is inputted as an input analog signal into the AD conversion unit 104. The AD conversion unit 104 sequentially converts the inputted analog signals into digital signals. As a result, as the output of the AD conversion unit 104, a signal such as a digital signal 903 as shown in FIG. 2B can be obtained, the signal having the digital signal value associated with the signal received by the antenna terminal 101a and the digital signal value associated with the signal received by the antenna terminal 101b, the digital signal values being alternately arranged for every other sample, using the time-division method.

Hereinafter, referring to FIG. 1 again, the configuration of the diversity reception apparatus according to the first embodiment will be explained. In order to enable the later described processing, the output signal received by the AD conversion unit 104 as described above is separated again, by the time-division separation unit 106, into a digital signal value associated with the signal received by the antenna terminal 101a and the digital signal value associated with the signal received by the antenna terminal 101b. This is because in the processes described hereinafter such as phase additive composition processing, processing between samples is required for a signal received by each antenna. Therefore, the data structure as shown in the digital signal 903 in FIG. 2B is inappropriate.

And, the received signals are respectively inputted into the corresponding signal quality judgment units 107a and 107b, the received signals having been separated into each signal for each antenna terminal by the time-division separation unit 106.

Each of the signal quality judgment units 107a and 107b judges reception level and the like mainly using strength of the received signal. And, quality of the signal received by each antenna terminal is judged.

The composition unit 108 (i) executes additive composition on the output signals outputted from the time-division separation unit 106, while adjusting the phases and the levels based on the signal quality indicator information respectively outputted from the signal quality judgment units 107a and 107b, and (ii) obtains an output signal.

The demodulation unit 109 demodulates the signal outputted from the composition unit 108, and obtains a final demodulated signal.

According to the configuration as described above, it is possible to realize a diversity reception apparatus which can (i) execute the composition processing on the intermediate frequency signals obtained from the two antenna signals using only one AD conversion unit 104 and (ii) be applied to processing analog signal using a simple and inexpensive configuration.

In the above mentioned explanation, in judging the signal quality, the signal quality judgment units 107a and 107b are set for each signal associated with each antenna, the signal being outputted from the time-division separation unit 106. However, in the case where the signal quality judgment processing is executed using signal strength of each sample and the like, it is possible to time-divisionally use one judgment unit. The block diagram of FIG. 3 shows such case as described above.

Figure 3:
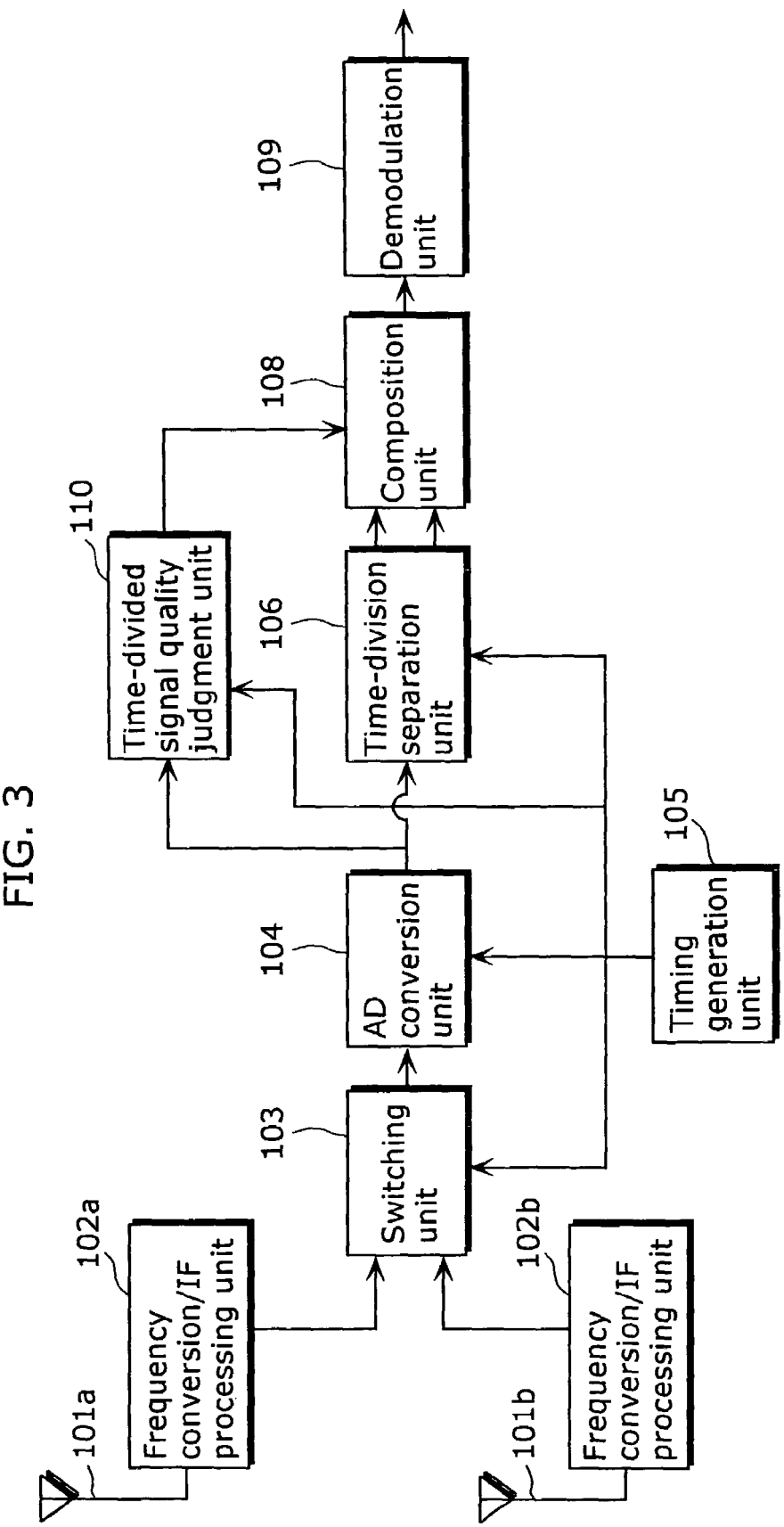
FIG. 3 is a block diagram showing another configuration of a diversity reception apparatus according to the first embodiment of the present invention.

FIG. 3 shows a circuit configuration diagram of a diversity reception apparatus including a time-divided signal quality judgment unit 110. In FIG. 3, the same components as in FIG. 1 are assigned with the same codes, and the explanation will be omitted. As shown in FIG. 3, in the case where the time-division processing is replaced with the signal quality judgment processing, the time-divided signal quality judgment unit 110 is arranged next to the output of the AD conversion unit 104, in place of the signal quality judgment units 107a and 107b.

According to such configuration as described above, the implementation of the time-divided signal quality judgment unit 110 is slightly limited, but the diversity reception apparatus can be realized using an even simpler configuration.

Second Embodiment

Hereinafter, a second embodiment of the diversity reception apparatus according to the present invention will be explained referring to the drawings. The diversity reception apparatus according to the second embodiment uses only one AD conversion unit and converts the signals received by the antennas into a digital signal without executing the frequency conversion processing.

Figure 4:
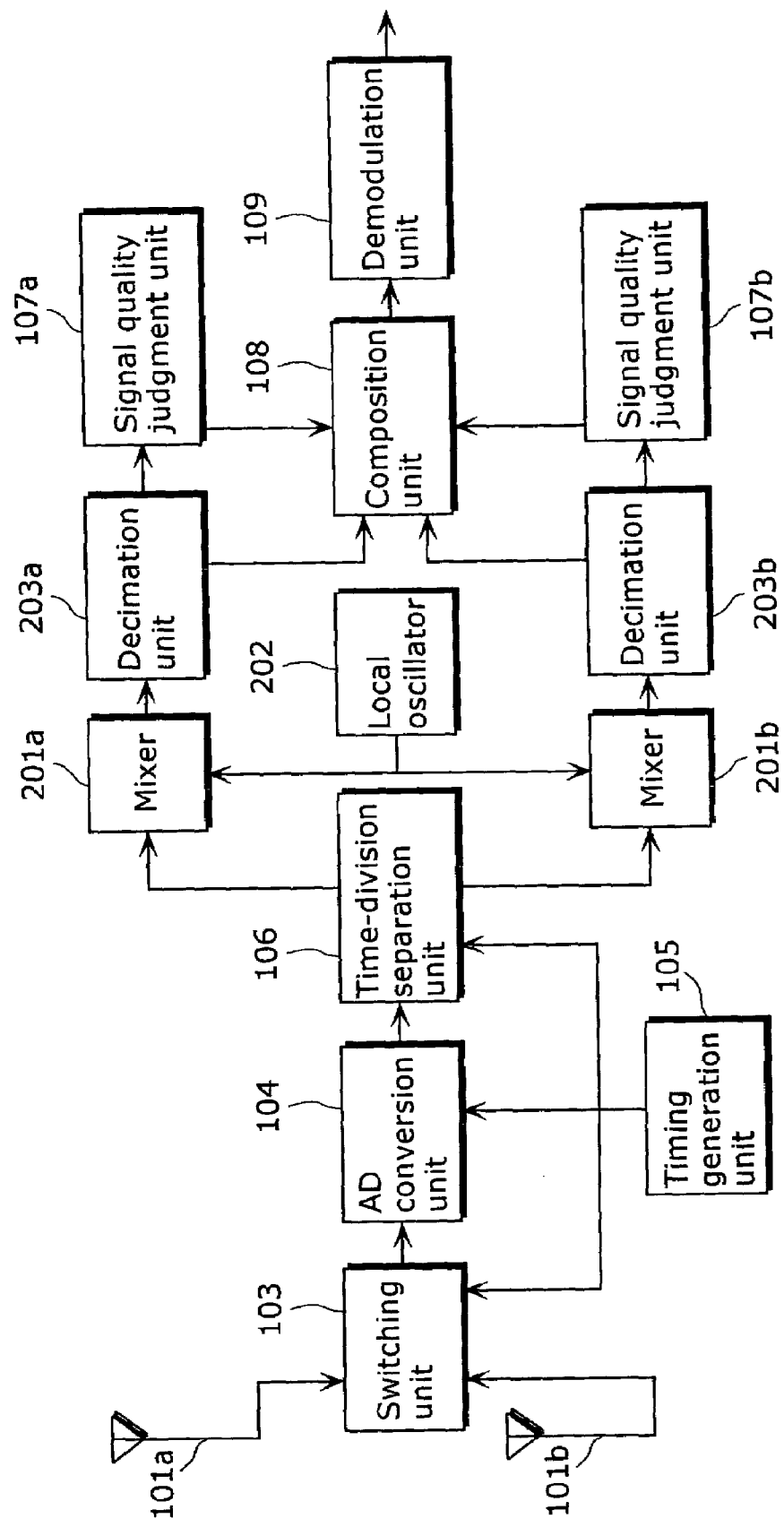
FIG. 4 is a block diagram showing a configuration of a diversity reception apparatus according to a second embodiment of the present invention.

FIG. 4 is a block diagram showing a configuration of the diversity reception apparatus according to the second embodiment of the present invention. In FIG. 4, the same components as in FIG. 1 are assigned with the same codes, and the explanation will be omitted. Also, compared to FIG. 1, the diversity reception apparatus according to the second embodiment does not include the frequency conversion/IF processing unit, but includes a mixer, a local oscillator and a decimation unit after the processing executed by the time-division separation unit.

The diversity reception apparatus according to the second embodiment of the present invention as shown in FIG. 4 has a configuration in which the signal inputted from the antenna terminal is inputted into the switching unit 103 without frequency-conversion. Also, the output of the time-division separation unit 106 is connected to mixers 201a and 201b which are connected to the local oscillator 202. The outputs of the mixers 201a and 201b are, respectively, connected to the decimation units 203a and 203b. And, the outputs of the decimation units 203a and 203b are, respectively, connected to the signal quality judgment units 107a and 107b and the composition unit 108.

According to such configuration as described above, the same processes as the first embodiment are performed by the switching unit 103, the AD conversion unit 104, the timing generation unit 105 and the time-division separation unit 106, on the signals received by the antenna terminals 101a and 101b. And, the processed signals are outputted to the mixers 201a and 201b. Here, in the second embodiment, the appropriate frequency of the timing signal generated in the timing generation unit 105 is N times as high as the sampling frequency required in the mixers 201a and 201b. In other words, in the case where there are two antennas, the appropriate frequency of the timing signal is twice as high frequency as the sampling frequency.

The signals respectively associated with the antenna terminals 101a and 101b and outputted from the time-division separation unit 106 are (i) mixed with the signals generated by the local oscillator 202 respectively in the mixers 201a and 201b, and then are (ii) converted into baseband signals and intermediate frequency signals. The sampling frequency of the signals outputted from the mixers 201a and 201b is the frequency required for the mixing process executed in the mixers 201a and 201b, and is higher than the sampling frequency required for demodulation executed in the demodulation unit 109. Therefore, decimation processing and filter processing are executed on the signals outputted from the mixers 201a and 201b in the decimation units 203a and 203b, and the signals are inputted into the signal quality judgment units 107a and 107b and the composition unit 108.

In the signal quality judgment units 107a and 107b, qualities of the signals received by the respective antenna terminals are judged. In the composition unit 108, the signals outputted from the time-division separation unit 106 are additively composed, while adjusting the phases and the levels based on the signal quality indicator information outputted from the signal quality judgment units 107a and 107b, respectively; thereby the output signal is obtained. In the demodulation unit 109, the signal outputted from the composition unit 108 is demodulated, thereby the final demodulated signal can be obtained.

According to such configuration as described above, it is possible to realize, using a simple configuration, a diversity reception apparatus which uses only one AD conversion unit 104, converts the signals received by the antennas 101a and 101b into digital signals without executing frequency conversion processing, and can also deal with analog demodulated signals. In particular, the diversity reception apparatus according to the second embodiment is useful for being applied to a system LSI.

Third Embodiment

Hereinafter a third embodiment of the diversity reception apparatus according to the present invention will be explained referring to the drawings. Here, having an even simpler configuration, the diversity reception apparatus according to the third embodiment only uses one AD conversion unit, and converts the signals received by the antennas into digital signals without executing frequency conversion processing.

Figure 5:
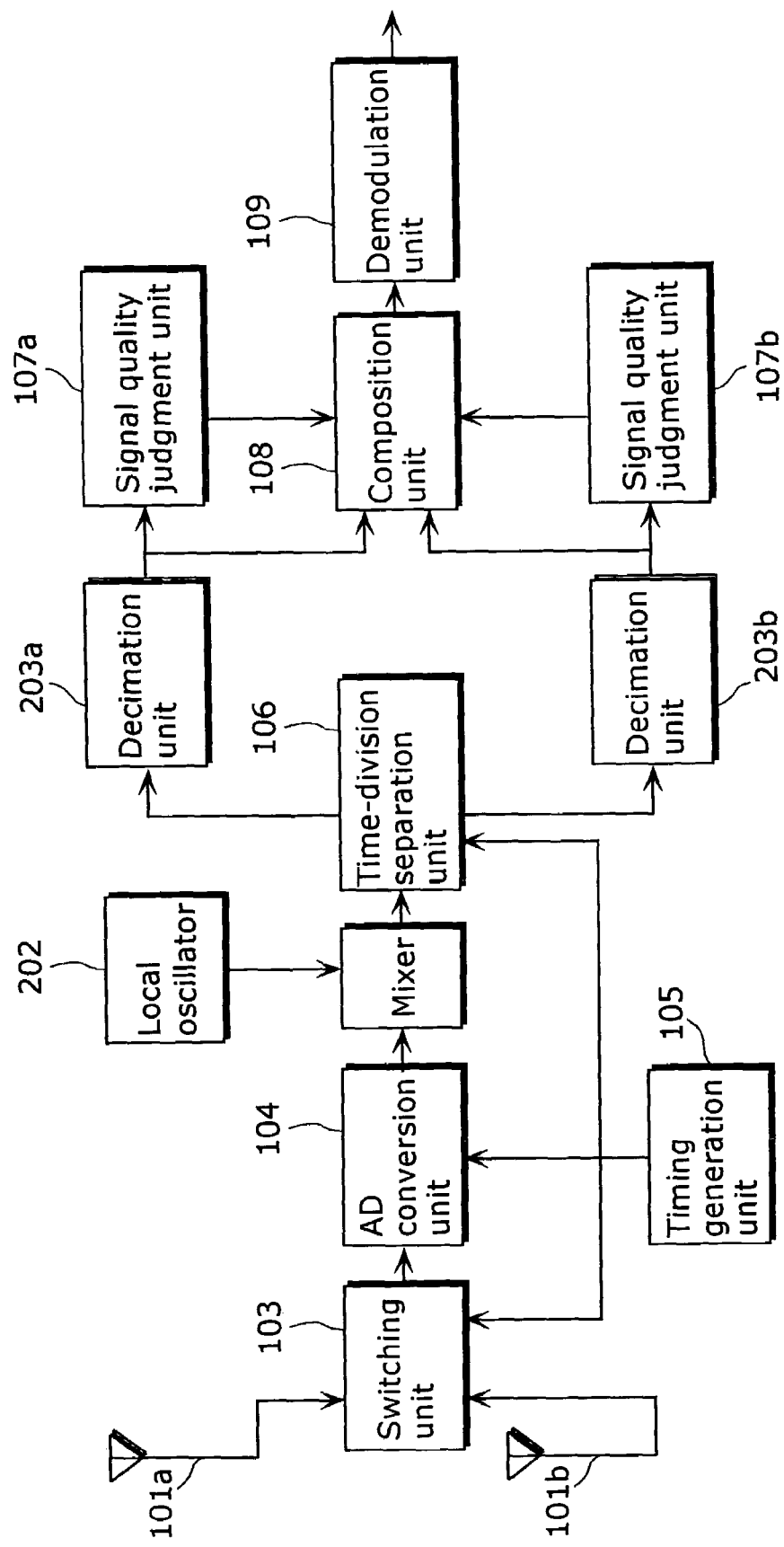
FIG. 5 is a block diagram showing a configuration of a diversity reception apparatus according to a third embodiment of the present invention.

FIG. 5 is a block diagram showing a configuration of the diversity reception apparatus according to the third embodiment of the present invention. In FIG. 5, the same components as in FIG. 4 are assigned with the same codes, and the explanation will be omitted. According to the third embodiment, the mixer 201 is arranged between the AD conversion unit 104 and the time-division separation unit 106, and the outputs of the time-division separation unit 106 are respectively connected to the decimation units 203a and 203b.

As the output from the AD conversion unit 104, the signals received by the antenna terminals 101a and 101b are alternately outputted using the time-division multiplex method, at the frequency which is the sampling frequency multiplied by the number of antennas, that is, in the configuration of FIG. 5 showing two antennas, twice as high as the sampling frequency.

Also, according to the third embodiment, the mixer 201 and the local oscillator 202 operate at the same frequency as the AD conversion unit 104. The mixer 201 takes in the signals outputted from the AD conversion unit 104, mixes the signals with the signals generated by the local oscillator 202, and outputs base band signals and intermediate frequency signals which are arranged using the time-division multiplex method. The time-division separation unit 106 separates theses signals into the signals associated with each antenna, and outputs the separated signals respectively to the decimation units 203*a* and 203*b*.

The subsequent processes are the same as the operations performed by the diversity reception apparatus according to the second embodiment, and the explanation will be omitted.

According to the above mentioned configuration, although the components requiring fast processing increases, it is possible to realize, using an even simpler configuration, a diversity reception apparatus which uses only one AD conversion unit 104, converts the signals received by the antennas 101*a* and 101*b* into digital signals without executing frequency conversion processing, and can deal with the analog modulated signals.

Figure 6:
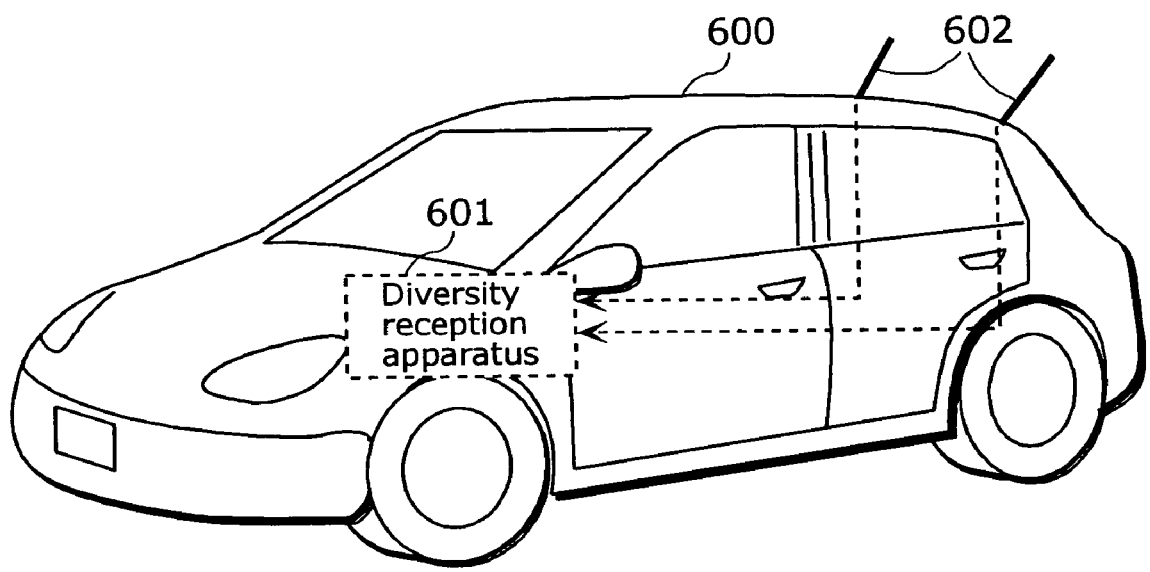
FIG. 6 is an outside view of a car including a diversity reception apparatus according to the present invention.

FIG. 6 is an outside view of a car 600 including a diversity reception apparatus 601 according to the present invention. As shown in FIG. 6, for example, the diversity reception apparatus 601 according to the present invention can be used for receiving broadcast waves of radio or TV by antennas 602 and executing composition processing.

Although the above mentioned embodiments explained the case where the number (N) of the antennas is two, there are other cases as well. Needless to say, the diversity reception apparatus according to the present invention can be applied not only to receiving the analog modulated signals but also to receiving the digital modulated signals.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be applied to a diversity reception apparatus and a system LSI which realizes diversity reception, the diversity reception apparatus receiving analog modulated signals such as AM broadcast and FM broadcast, and digitally executing signal processing. Also, the diversity reception apparatus can be applied to an in-car diversity reception apparatus, a mobile terminal, wireless LAN and the like which receive TV or radio broadcast.

What is claimed is:

1. A diversity reception apparatus that composes signals received by N antenna terminals, where N is a positive integer that is two or larger, the apparatus comprising:
   a single switching unit operable to sequentially switch between N inputs for the signals received by the N antenna terminals and also to output a single signal;
   a single analog/digital (AD) conversion unit operable to convert the single signal into a time-division multiplexed digital signal;
   a single time-division separation unit operable to separate the digital signal into N time-divided signals and to output the N time-divided signals, said single time-division separation unit not being operable to demodulate the digital signal;
   a timing generation unit operable to control each operation of said single switching unit, said single AD conversion unit and said single time-division separation unit, using a timing signal having a same frequency;
   N frequency conversion/intermediate frequency (IF) processing units each being connected to a respective one of the N antenna terminals, said N frequency conversion/IF processing units being operable to convert the signals received by the respective antenna terminals into signals having an intermediate frequency;
   N signal quality judgment units each operable to judge a signal quality of a respective one of the N time-divided signals outputted by said single time-division separation unit;
   a composition unit connected to said single time-division separation unit and said N signal quality judgment units, said composition unit being operable to compose the N time-divided signals based on the signal qualities; and
   a single demodulation unit operable to demodulate a single signal outputted by said composition unit,
   wherein the N inputs of said single switching unit are each connected to a respective one of said N frequency conversion/IF processing units.

2. The diversity reception apparatus according to claim 1, further comprising
   a time-divided signal quality judgment unit operable to judge strength of the digital signal outputted by said single AD conversion unit,
   wherein said timing generation unit is further operable to control each operation of said time-divided signal quality judgment unit, and
   said composition unit is further connected to said time-divided signal quality judgment unit and is operable to compose the N time-divided signals based on the strength of each of the N time-divided signals.

3. The diversity reception apparatus according to claim 1, wherein the frequency of the timing signal generated by said timing generation unit is N times as high as a sampling frequency used on said demodulation unit.

4. A car including the diversity reception apparatus according to claim 1.

5. A diversity reception method for use in a diversity reception apparatus that composes signals received by N antenna terminals, where N is a positive integer which is two or larger, the method comprising:
   sequentially switching between N inputs for the signals received by the N antenna terminals and also outputting a single signal;
   analog/digital (AD) converting the single signal outputted in said sequentially switching into a time-division multiplexed digital signal;
   time-division separating the digital signal into N time-divided signals using a single time-division separation unit that is not operable to demodulate the digital signal and outputting the N time-divided signals; and
   controlling each operation of said sequentially switching, said AD converting and said time-division separating, using a timing signal having a same frequency.

6. The diversity reception method according to claim 5, further comprising:
   converting the signals received by the N antenna terminals into signals having an intermediate frequency;
   judging a signal quality of each of the N time-divided signals;
   synthesizing the N time-divided signals based on the signal qualities, after said time-division separating and said N time-divided signal quality judging; and
   demodulating a signal outputted in said synthesizing.

7. A diversity reception apparatus that composes signals received by N antenna terminals, where N is a positive integer that is two or larger, the apparatus comprising:
   a single switching unit operable to sequentially switch between N inputs for the signals received by the N antenna terminals and also to output a single signal;

a single analog/digital (AD) conversion unit operable to convert the single signal into a time-division multiplexed digital signal;

a single time-division separation unit operable to separate the digital signal into N time-divided signals and to output the N time-divided signals, said single time-division separation unit not being operable to demodulate the digital signal;

a timing generation unit operable to control each operation of said single switching unit, said single AD conversion unit and said single time-division separation unit, using a timing signal having a same frequency;

N frequency conversion/intermediate frequency (IF) processing units each being connected to a respective one of the N antenna terminals, said N frequency conversion/IF processing units being operable to convert the signals received by the respective antenna terminals into signals having an intermediate frequency, wherein the N inputs of said single switching unit are each connected to a respective one of said N frequency conversion/IF processing units;

N signal quality judgment units each operable to judge a signal quality of a respective one of the N time-divided signals outputted by said single time-division separation unit;

N mixers that are each connected to a respective one of N outputs of said single time-division separation unit;

a local oscillator connected to said N mixers;

N decimation units that are each connected to an output of a respective one of said N mixers, wherein said N signal quality judgment units are each connected to an output of a respective one of said N decimation units, and a composition unit is connected to said N decimation units and said N signal quality judgment units; and a single demodulation unit operable to demodulate a signal outputted by said composition unit.

8. A diversity reception apparatus that composes signals received by N antenna terminals, where N is a positive integer that is two or larger, the apparatus comprising:

a single switching unit operable to sequentially switch between N inputs for the signals received by the N antenna terminals and also to output a single signal;

a single analog/digital (AD) conversion unit operable to convert the single signal into a time-division multiplexed digital signal;

a single time-division separation unit;

a timing generation unit operable to control each operation of said single switching unit, said single AD conversion unit and said single time-division separation unit, using a timing signal having a same frequency;

N frequency conversion/intermediate frequency (IF) processing units each being connected to a respective one of the N antenna terminals, said N frequency conversion/IF processing units being operable to convert the signals received by the respective antenna terminals into signals having an intermediate frequency, wherein the N inputs of said single switching unit are each connected to a respective one of said N frequency conversion/IF processing units;

a mixer connected to said single AD conversion unit;

a local oscillator connected to said mixer;

N decimation units that are each connected to a respective output of said single time-division separation unit;

N signal quality judgment units;

a composition unit connected to said N decimation units and said N signal quality judgment units, wherein said single time-division separation unit is operable to separate a single signal outputted from said mixer into N time-divided signals and also to output the N time-divided signals each to a respective one of said N decimation units and said single time division separation unit is not operable to demodulate the digital signal, and wherein each N signal quality judgment unit is operable to judge a signal quality of a respective one of the N time-divided signals outputted by said single time-division separation unit, wherein each N signal quality judgment unit is connected to an output of a respective one of said decimation units; and a single demodulation unit operable to demodulate a single signal outputted from said composition unit.

* * * * *